United States Patent
Ramalingam et al.

(10) Patent No.: US 9,942,144 B1
(45) Date of Patent: Apr. 10, 2018

(54) FIBRE CHANNEL OVER ETHERNET (FCOE) LINK AGGREGATION GROUP (LAG) SUPPORT IN DATA CENTER NETWORKS

(71) Applicant: Juniper Networks, Inc., Sunnyvale, CA (US)

(72) Inventors: Nirmal Kumar Ramalingam, Sunnyvale, CA (US); Amit Shukla, Sunnyvale, CA (US); Srilakshmi Adusumalli, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 33 days.

(21) Appl. No.: 14/502,136

(22) Filed: Sep. 30, 2014

(51) Int. Cl.
| | | |
|---|---|---|
| H04L 12/26 | (2006.01) |
| H04L 12/66 | (2006.01) |
| H04L 12/24 | (2006.01) |
| H04L 12/741 | (2013.01) |
| H04L 12/947 | (2013.01) |
| H04L 12/721 | (2013.01) |

(52) U.S. Cl.
CPC ............ *H04L 45/745* (2013.01); *H04L 45/66* (2013.01); *H04L 49/252* (2013.01)

(58) Field of Classification Search
CPC ............. H04L 45/745; H04L 29/12886; H04L 61/6022
USPC .............................................. 370/401, 395.52
See application file for complete search history.

(56) References Cited

U.S. PATENT DOCUMENTS

| | | | |
|---|---|---|---|
| 8,806,058 B1 | 8/2014 | Mackie et al. | |
| 2011/0051733 A1* | 3/2011 | Hirata | H04L 49/10 370/400 |
| 2012/0163395 A1* | 6/2012 | Shukla | H04L 12/56 370/409 |
| 2012/0182866 A1* | 7/2012 | Vinayagam | H04L 45/245 370/228 |
| 2013/0028135 A1* | 1/2013 | Berman | H04L 12/4625 370/254 |

(Continued)

OTHER PUBLICATIONS

IEEE Std 802.3ad-2000 "Aggregation of Multiple Link Segments" Amendment to Carrier Sense Multiple Access with Collision Detection (CSMA/CD) Access Method and Physical Layer Specifications, 2000, 182 pgs.

(Continued)

*Primary Examiner* — Parth Patel
*Assistant Examiner* — Jason Harley
(74) *Attorney, Agent, or Firm* — Shumaker & Sieffert, P.A.

(57) ABSTRACT

Techniques are described for supporting Fiber Channel over Ethernet (FCoE) link aggregation groups (LAGs) between a server and a data center switch in a data center. The techniques enable an access switch in the data center switch to assign class identifiers to each member link in an FCoE LAG between an FCoE node (Enode) of the server and the access switch. In this way, the access switch is able to redirect FCoE traffic from a Fiber Channel forwarder (FCF) of a storage area network (SAN) toward the Enode on the correct member link of the FCoE LAG. The techniques also enable scaling of FCoE initialization protocol (FIP) and FCoE sessions by installing FIP snooping filters that use on a source media access control (MAC) address hit determination in ingress filter processors (IFPs) of the access switch to avoid session limitations of virtual local area network (VLAN) filter processors (VFPs).

17 Claims, 6 Drawing Sheets

(56) References Cited

U.S. PATENT DOCUMENTS

2013/0148659 A1\* 6/2013 Shukla ................ H04L 61/6045
   370/390
2013/0336317 A1\* 12/2013 Mithyantha ........... H04L 45/586
   370/390

OTHER PUBLICATIONS

"Fibre Channel Backbone-5 Rev. 2.00" INCITS xxx-200x, INCITS working draft proposed American National Standard for Information Technology, Jun. 4, 2009, 180 pgs.

\* cited by examiner

| MAC TABLE ||||
| VLAN ID | MAC ADDRESS | INTERFACE ID | CLASS ID |
| --- | --- | --- | --- |
| VLAN1 | FCF_MAC | PORT A | FCID1 |
| VLAN1 | VN_MAC1 | FCoE LAG | DestClassID1 |
| VLAN1 | VN_MAC2 | FCoE LAG | DestClassID2 |
| VLAN1 | VN_MAC3 | FCoE LAG | DestClassID3 |

FIG. 4

FIBRE CHANNEL OVER ETHERNET (FCOE) LINK AGGREGATION GROUP (LAG) SUPPORT IN DATA CENTER NETWORKS

TECHNICAL FIELD

The invention relates to computer networks and, more particularly, to data center networks.

BACKGROUND

A data center is a specialized facility that houses web sites and provides data serving and backup as well as other network-based services for subscribers. A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities.

A data center switching architecture is used to provide subscribers and applications used by the subscribers with access to the web sites, data, and services housed in a data center. In some examples, the data center switching architecture comprises a multi-tiered architecture in which two or three tiers of Layer 2 switches are interconnected to aggregate data center traffic from servers and other devices in the data center to Layer 3 routers that communicate with other data centers or external networks. In other examples, the data center switching architecture may be flattened into a single tier of distributed access switches directly connected to one another across a fabric backplane to transmit traffic directly between servers, routers, and other devices connected to the access switches. The single tier fabric architecture can be managed as a single data center switch with distributed data and control planes across the components in the switch and a centralized management and configuration system.

Fibre Channel is a high-speed communications technology primarily used to interconnect storage systems and servers in a Storage Area Networks (SAN). Fibre Channel over Ethernet (FCoE) is a standard for encapsulating Fibre Channel traffic within Ethernet frames to transport Fibre Channel frames of the SAN over a data center network. In this way, the FCoE standard allows data center administrators to drastically reduce cabling among servers and storage systems and also permits server virtualization within the SAN. Fibre Channel technologies are described in "Fibre Channel Backbone-5 Rev. 2.00," International Committee for Information Technology Standards, Jun. 4, 2009, which is incorporated herein by reference.

SUMMARY

In general, the disclosure describes techniques for supporting Fibre Channel over Ethernet (FCoE) link aggregation groups (LAGs) between a server and a data center switch in a data center. The FCoE protocol is a standard for encapsulating Fibre Channel traffic within Ethernet frames to transport Fibre Channel frames of a storage area network (SAN) to the server in the data center. An FCoE node (Enode) of the server and a Fibre Channel forwarder (FCF) of the SAN exchange FCoE initialization protocol (FIP) messages to establish and maintain a plurality of Fibre Channel virtual links. Once the virtual links are established, FCoE sessions may be established between the Enode of the server and the FCF of the SAN to exchange FCoE packets. The data center switch may operate as an FCoE transit switch between the Enode of the server and the FCF of the SAN. The FCoE standard requires a point-to-point link between the Enode on the server and the FCF of the SAN. In order to emulate the point-to-point link, the data center switch includes FIP and FCoE traffic filters, and must send all FIP and FCoE request and response pairs over the same virtual link.

The techniques of this disclosure support FCoE LAGs in data centers by enabling access switches included in the data center switch to assign class identifiers to each member link included in an FCoE LAG between the Enode of the server and the access switch of the data center switch. In this way, the access switch is able to redirect FCoE traffic from the FCF of the SAN toward the Enode on the server on the correct member link of the FCoE LAG. In addition, the techniques of this disclosure enable scaling of FIP and FCoE sessions by installing FIP snooping filters in ingress filter processors (IFPs) in the forwarding plane of the access switch to avoid session limitations of virtual local area network (VLAN) filter processors (VFPs). For example, the access switch may include an IFP filter rule based on a source media access control (MAC) address hit determination to provide FIP snooping filtering in order to only allow FCoE packets from Enodes that are logged-in to the FCF of the SAN.

In one example, this disclosure is directed to a method comprising receiving, with an access switch of a data center and from a FCF of a SAN, a first FCoE packet destined for a destination MAC address of an Enode of a server; determining, based on an entry for the destination MAC address in a MAC table of the access switch, a FCoE 1LAG interface and a class identifier associated with the destination MAC address of the Enode; and forwarding the first FCoE packet to the Enode on a member link of the FCoE LAG interface identified by the class identifier.

In another example, this disclosure is directed to an access switch in a data center, the access switch comprising a control unit configured to establish a FCoE LAG between the access switch and an Enode of a server, and a forwarding engine including a MAC table, an FCoE LAG interface, and at least one port to receive, from the FCF of the SAN, a first FCoE packet destined for a destination MAC address of the Enode of the server. The forwarding engine is configured to determine, based on an entry for the destination MAC address in the MAC table, the FCoE LAG interface and a class identifier associated with the destination MAC address of the Enode, and forward the first FCoE packet to the Enode on a member link of the FCoE LAG interface identified by the class identifier.

In a further example, a computer-readable storage medium comprising instructions that when executed cause one or more processors to receive, with an access switch of a data center and from a FCF of a SAN, a first FCoE packet destined for a destination MAC address of an Enode of a server; determine, based on an entry for the destination MAC address in a MAC table of the access switch, a FCoE LAG interface and a class identifier associated with the destination MAC address of the Enode; and forward the first FCoE packet to the Enode on a member link of the FCoE LAG interface identified by the class identifier.

The details of one or more examples of this disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a conceptual diagram illustrating an example MAC table within a forwarding engine of an access switch of a data center switch configured to operate as an FCoE transit switch.

DETAILED DESCRIPTION

Figure 1:
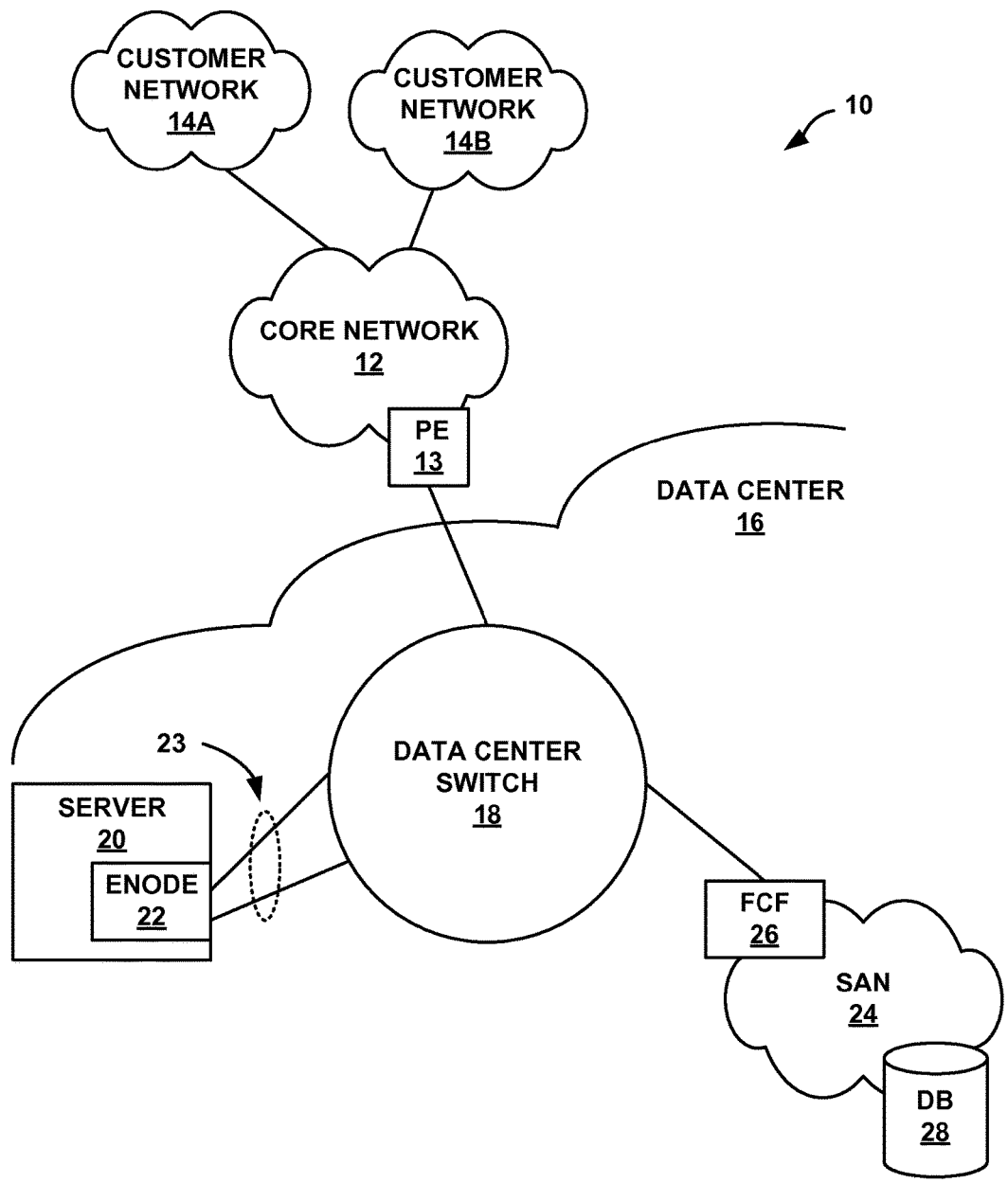
FIG. 1 is a block diagram illustrating an example network system including a data center with a data center switch configured to operate as a Fibre Channel over Ethernet (FCoE) transit switch between a server and a storage area network (SAN).

FIG. 1 is a block diagram illustrating an example network system 10 including a data center 16 with a data center switch 18 configured to operate as a Fibre Channel over Ethernet (FCoE) transit switch between a server 20 and a storage area network (SAN) 24. Data center 16 is a facility that, in some examples, houses web sites and provides data serving and backup as well as other network-based services. Core network 12, in turn, provides customer networks 14A-14B (collectively "customer networks 14") with access to the web sites, data and services housed in data center 16.

A data center in its most simple form may consist of a single facility that hosts all of the infrastructure equipment, such as networking and storage systems, redundant power supplies, and environmental controls. More sophisticated data centers are normally organizations spread throughout the world with subscriber support equipment located in various physical hosting facilities. In some examples, data center 16 may represent one of many geographically distributed network data centers. As illustrated in the example of FIG. 1, data center 16 may be a facility that includes server 20 connected to SAN 24 to provide resources for customer network 14. In other examples, data center 16 may include multiple different servers connected to multiple different SANs.

Customer networks 14 may be collective entities such as enterprises and governments or individuals. For example, data center 16 could house web servers for several small businesses. Other exemplary services offered by data center 16 may include data storage, virtual private networks, traffic engineering, file service, data mining, scientific- or supercomputing, and so on. In some embodiments, data center 16 may include individual network servers, network peers, or otherwise.

Core network 12 may be coupled to one or more networks (not shown) and may thus form part of a large-scale public network infrastructure, e.g., the Internet. Core network 12, therefore, may provide end users in customer networks 14 with access to the Internet. In addition, core network 12 may provide data center 16 with access to the Internet, and may allow server 20 within data center 16 to communicate with other servers in other remote data centers. Provider edge (PE) router 13 of core network 12 performs Layer 3 routing to route network traffic between data center 16 and customer networks 14 over core network 12. Core network 12 may include a variety of network devices other than PE router 13, such as other PE routers, core routers, customer edge (CE) routers, and switches.

Data center 16 includes data center switch 18 to connect server 20 to core network 12 via PE router 13, and to connect server 20 to SAN 24. Data center switch 18 may include a plurality of access switches, e.g., top-of-rack (TOR) switches, interconnected via one or more distribution or core switches. In some examples, the architecture of data center switch 18 comprises a multi-tiered architecture in which two or three tiers of access switches and core switches are interconnected to transport data center traffic between server 20, SAN 24, and PE router 13 that communicates with core network 12 and/or other data centers.

In other examples, the architecture of data center switch 18 may be flattened into a single tier of distributed access switches directly connected to one another across a fabric backplane of distribution switches to transmit traffic directly between server 20, SAN 24, and PE router 13 connected to the access switches. In the example of the single tier fabric architecture, data center switch 18 can be managed as a single switch with distributed data and control planes across the components in data center switch 18 and a centralized management and configuration system. Data center switch 18 is generally described in this disclosure as conforming to the single tier fabric architecture. This example architecture of data center switch 18 is described in more detail with respect to FIG. 2. In other examples, however, data center switch 18 may conform to a different architecture, such a multi-tiered architecture or a different type of single tier architecture.

In the illustrated example, data center switch 18, or more accurately each of the access switches included in data center switch 18, is configured to operate as a Fibre Channel over Ethernet (FCoE) transit switch between FCoE forwarder (FCF) 26 of SAN 24 and FCoE node (Enode) 22 of server 20. Enode 22 and FCF 26, i.e., FCoE devices, exchange FCoE initialization protocol (FIP) messages to establish and maintain a plurality of Fibre Channel virtual links. The FCoE devices use FIP messages to first discover, i.e., solicit and advertise, FCoE virtual local area networks (VLANs) and remote virtual Fibre Channel interfaces, and then perform virtual link initialization functions including a login function between Enode 22 and FCF 26. Once the virtual links are established, FCoE sessions may be established between Enode 22 and FCF 26 to exchange FCoE packets. An FCoE packet refers to an Ethernet frame that includes an FCoE packet data unit (PDU) that is identified as an FCoE Ethernet Type encapsulating a byte-encoded Fibre Channel frame.

SAN 24 represents a Fibre Channel fabric SAN or other Fibre Channel-based network or Fibre Channel storage array having elements that implement Fibre Channel protocols to provide Fibre Channel services. SAN 24 includes storage database (DB) 28 that exchanges data with other elements of SAN 24 for storage and/or service. FCF 26 provides Fibre Channel services associated with a Fibre Channel switch. For example, FCF 26 may represent a head device or top-of-rack (TOR) switch that includes an FCF entity to forward Fibre Channel frames using FCoE within data center 16, where the rack includes storage DB 28. FCF 26 encapsulates Fibre Channel frames received from SAN 24 using FCoE encapsulation for forwarding over data center switch 18 toward Enode 22 of server 20 as FCoE packets. FCF 26 decapsulates FCoE packets received from Enode 22 of server 20 via data center switch 18 using FCoE decapsulation for forwarding as Fibre Channel frames in SAN 24 toward storage DB 28.

Server 20 may include an application server, such as a web server. Server 20 is an FCoE-capable server that obtains and sends/serves data stored by storage DB 28 of SAN 24 to entities external to data center 16, and receives data from entities external to data center 16 and stores the data to storage DB 28 of SAN 24. Server 20 may include one or more Converged Network Adapters (CNA) (not shown) to support both Fibre Channel and traditional Ethernet traffic. Enode 22 is typically a portion of the CNA that handles the FCoE traffic. Enode 22 presents virtual Fibre Channel interfaces to data center switch 18 and FCF 24 in the form of virtual node (VN) ports. A VN port emulates a native Fibre Channel port and performs similar functions of handling the creation, detection and flow of FCoE messages to and from FCF 24. In some examples, Enode 22 may host a plurality of VN ports, and each of the VN ports has an assigned media access control (MAC) address and a separate, unique virtual link with data center switch 18.

Data center switch 18, operating as an FCoE transit switch, is a Layer 2 data center bridging (DCB) switch that transports FIP packets and FCoE packets between Enode 22 and FCF 26. Data center switch 18 may transport both FCoE and regular Ethernet traffic within data center 16. In general, data center switch 18 does not encapsulate or decapsulate Fibre Channel frames in Ethernet. Rather, data center switch 18, as an FCoE transit switch, operates as a passthrough switch to transparently forward FCoE packets between Enode 22 and FCF 26. In some examples, data center switch 18 may perform FIP snooping to monitor FIP messages including logins, solicitations and advertisements that pass through data center switch 18 in order to learn MAC addresses of ports on Enode 22 and FCF 26.

Native Fibre Channel uses point-to-point physical links between Fibre Channel devices, e.g., Enode 22 of server 20 and FCF 26 of SAN 24. In FCoE, the virtual links replace the physical inks and emulate point-to-point links between two FCoE device endpoints, such as a VN port of Enode 22 and a FCF port on FCF 24. The virtual link may traverse data center switch 18 as an FCoE transit switch. Data center switch 18 may emulate native Fibre Channel by applying FIP and FCoE traffic filters, and sending all FIP and FCoE request and response pairs over the same virtual link. For example, data center switch 18 may apply FIP snooping filters that only permit access to Enodes that are logged-in to FCF 26 to prevent unauthorized access and data transmission from server 20 to SAN 24. In this way, data center switch 18 transparently aggregates virtual links while still appearing and functioning as a point-to-point connection to the FCoE devices.

As an example FCoE packet flow through data center 16, native Fibre Channel traffic from storage DB 28 flows through SAN 24 to FCF 26, and FCF 26 encapsulates that traffic in Ethernet as FCoE traffic. The FCoE traffic flows through data center switch 18 as an FCoE transit switch to Enode 22 of server 20. Enode 22 may then decapsulate the traffic to obtain the underlying Fibre Channel payload, which server 20 then manipulates for service according to the application to other devices, including devices external to data center 16 (e.g., customer networks 14). In the other direction, FCoE traffic encapsulated by Enode 22 of server 20 passes through data center switch 18 as an FCoE transit switch to FCF 26. FCF 26 removes the Ethernet encapsulation from the FCoE frames to restore the native Fibre Channel traffic. Native Fibre Channel traffic travels out of FCF 26 to storage DB 28 in SAN 24, which stores the underlying Fibre Channel payloads of the Fibre Channel traffic.

As illustrated in FIG. 1, links between Enode 22 and data center switch 18 are included in an FCoE link aggregation group (LAG) 23. FCoE LAG 23 may aggregate one or more physical Ethernet interfaces, including one or more virtual Fibre Channel interfaces presented on the physical Ethernet interfaces, to form a logical point-to-point link between Enode 22 and data center switch 18. In one example, each of Enode 22 and data center switch 18 optionally execute the Link Aggregation Control Protocol (LACP) to bundle the physical and virtual interfaces and treat the bundle as a single logical interface in terms of packet forwarding. Example details on LACP can be found in IEEE 802.3ad, Aggregation of Multiple Link Segments, the contents of which are incorporated herein by reference.

LAGs are typically used between servers and switches to achieve redundancy and load balancing across multiple links. In order to support FIP and FCoE sessions on a LAG bundle, each of the FIP and FCoE request and response pairs must be sent using the same member link included in the LAG interface. For example, if a FIP request is sent over port XE-1, which is part of a LAG interface AE-1, the FIP response also needs to go out on the same port, i.e., XE-1. Because a LAG is treated as a single logical interface, however, a switch may not be able to identify a specific virtual interface included in the LAG.

Conventionally, FCoE LAGs are not supported in a data center because a data center switch is not able to emulate the point-to-point links used by native Fibre Channel over a LAG. This is because the data center switch is only aware of the LAG interface for the LAG bundle connected to a given Enode, and is unable to identify the correct member link included in the LAG interface for a particular VN port of the Enode. Without support for an FCoE LAG, a FIP session cannot be established between a server and a SAN when the server is connected to a data center switch, operating as an FCoE transit switch, over a LAG interface. The data center switch, therefore, cannot use a LAG to transport both FCoE and IP Traffic toward the server. In this case, the data center switch may use normal interfaces for FCoE traffic and LAG interfaces for IP traffic.

The FCoE protocol provides increased flexibility, but with this flexibility new challenges may arise in assuring highly robust fabrics. Specifically, if data center switches, i.e., Ethernet bridges, exist between an Enode of a server and an FCF of a SAN, the point-to-point assurance between the Enode and FCF may be lost. Thus, the FCF does not have the same control as a native Fibre Channel switch. Equivalent robustness between FCoE and Fibre Channel may be achieved by ensuring that all FCoE traffic sent to and from Enode 22 passes through FCF 26, and that if multiple Enodes access FCF 26 through a single physical FCF port, those Enodes use their assigned MAC addresses. This may create the equivalent of a point-to-point link between Enode 22 and FCF 26. In addition, as described above, data center switch may include access control lists (ACLs) or firewall filters, which, when properly configured, may emulate a point-to-point link.

The disclosure describes techniques for supporting FCoE LAGs between server 20 and data center switch 18 in data center 16. The techniques enable each access switch included in data center switch 18 to assign class identifiers to each member link included in FCoE LAG 23 between Enode 22 of server 20 and the access switch of data center switch 18. In this way, the access switch is able to redirect FCoE traffic from FCF 26 of SAN 24 toward Enode 22 of server 20 on the correct member link of FCoE LAG 23. In addition, the techniques of this disclosure enable scaling of FIP and FCoE sessions by installing FIP snooping filters in ingress filter processors (IFPs) in the forwarding plane of the access switch of data center switch 18 to avoid session limitations of virtual local area network (VLAN) filter processors (VFPs). For example, the access switch of data center switch 18 may include an IFP filter rule based on a source MAC address hit determination to provide FIP snooping filtering in order to only allow FCoE packets from Enodes that are logged-in to FCF 26 of the SAN 24.

Although additional network devices are not shown for ease of explanation, it should be understood that network system 10 may comprise additional networks and/or data centers including, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Moreover, although the elements of network system 10 are illustrated as being directly coupled, it should be understood that one or more additional network elements may be included along any links between core network 12 and customer networks 14, any links between core network 12 and data center switch 18, and any links between data center switch 18, server 20 and SAN 24, such that the network elements of computer system 10 are not directly coupled.

Figure 2:
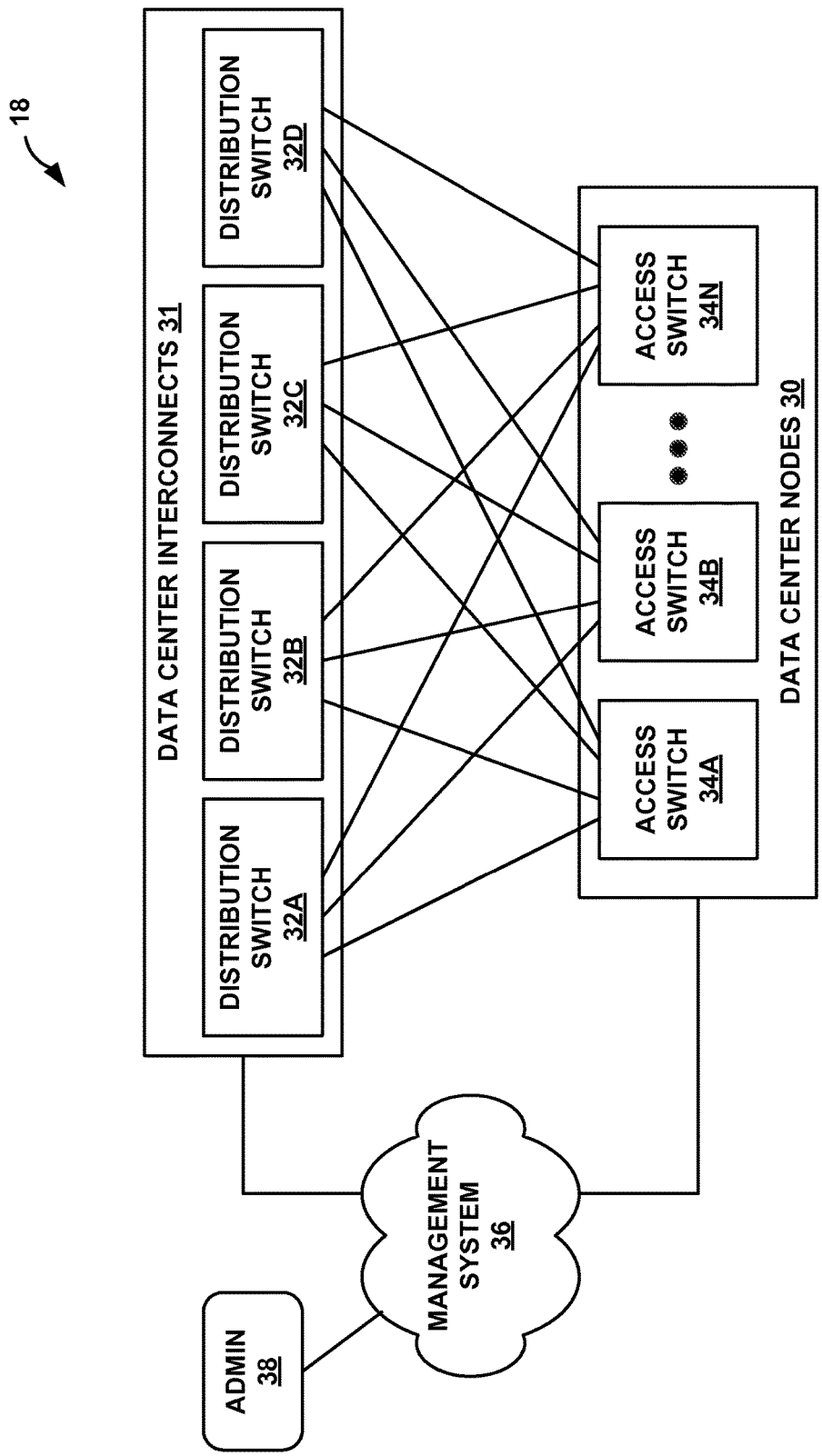
FIG. 2 is a block diagram illustrating an example of a data center switch including a centralized management system that configures components of the data center switch.

FIG. 2 is a block diagram illustrating an example of data center switch 18 including a centralized management system 36 to configure components of data center switch 18. Data center switch 18 conforms to a single tier fabric architecture that comprises a massively distributed system including up to hundreds of components. The architecture illustrated in FIG. 2 is merely exemplary and, in other examples, data center switch 18 may conform to a different architecture.

In the illustrated example, an administrator 38 interacts with components of data center switch 18 via centralized management system 36. Administrator 38 may comprise an individual, a team of individuals, an automated computer system or a semi-automated computer system. In some cases, administrator 38 may purely be a data center administrator responsible for configuration and monitoring of components in data center switch 18. In other cases, administrator 38 may also be a database administrator or a network administrator responsible for configuration and monitoring of routers, switches, servers, and other network devices external to data center switch 18.

In the example of FIG. 2, data center switch 18 includes data center nodes 30 interconnected via data center interconnects 31. Data center nodes 30 may comprise a plurality of access switches 34A-34N ("access switches 34"). For example, one or more of access switches 34 may be top-of-rack (TOR) switches. Data center interconnects 31 may comprise multiple distribution switches 32A-32D ("distribution switches 32"). In one example, in its full scale, data center switch 18 may include at least two director group nodes within management system 36, up to 128 access switches 34, up to four distribution switches 32, each containing up to eight front cards and two control boards, and up to two virtual chassis, each containing up to four control switches, to generate an out-of-band control plane network.

Access switches 34 form the access layer of data center switch 18 and provide networks devices, such as PE router 13 and servers 20 from FIG. 1, with access to the internal switch fabric of data center switch 18. The network devices may be connected to access switches 34 via a Gigabit Ethernet connection. Access switches 34 may provide layer 2 (MAC address) and/or layer 3 (IP address) switching functionality between the network devices.

In the illustrated example, each of access switches 34 is directly connected to each of distribution switches 32. Distribution switches 32 comprise the fabric interconnect backbone of data center switch 18 by providing layer 2 switching functionality to transfer data between connections of access switches 34. More specifically, each of distribution switches 32 includes front cards with multiple ports to receive and send data with access switches 34, and rear cards to transfer data between the front card ports. Distribution switches 32 may be connected to access switches 34 via a Gigabit Ethernet connection. Data en route from one network device to another, e.g., from PE router 13 to server 20A, may pass through one or more of access switches 34 and one or more of distribution switches 32.

Access switches 34 and distribution switches 32 include one or more processors capable of executing one or more software processes. For example, each of access switches 34 and distribution switches 32 may include a control unit and one or more packet forwarding engines (PFEs) (also referred to as "forwarding units"). The PFEs may be configured to switch packets from an input interface to an output interface of the switch using a switch fabric internal to the switch. For example, when access switch 34A receives a packet, an ingress PFE performs a lookup using forwarding information and forwards the network packet across an internal switch fabric of access switch 34A to an egress PFE of the switch. The egress PFE then forwards the network packet to a "next hop" device, which may be one of distribution switches 32 within data center switch 18 or a network device outside of data center switch 18 that is communicatively coupled to access switch 34A.

The single tier fabric architecture of data center switch 18 illustrated in FIG. 2 provides a highly distributed and interconnected system of switches that can be viewed by administrator 38 as a single switch. To achieve this, data center switch 18 includes data and control planes distributed across all components of switch 18, and centralized management system 36 through which administrator 38 can interact with any of the components of switch 18. More specifically, the routing and forwarding functionality of data center switch 18 is distributed across all access switches 34. For example, each of access switches 34 may perform routing operations by discovering its neighboring switches by sending hello messages, link state messages, broadcast messages or other routing protocol communications on each of its links to distribution switches 32. In addition, each of access switches 34 may execute a traffic distribution algorithm to determine traffic distribution across its links based on the discovered neighboring switches. In some cases, each of access switches 34 may share its routing information and traffic distribution with other components of data center switch 18 via the distributed control plane.

In order for administrator 38 to view the components of data center switch 18 as a single switch, the management and configuration processes for the components are centralized in management system 36. As illustrated in FIG. 2, management system 36 is connected to each of access switches 34 and distribution switches 32. In this way, administrator 38 can interact with any of the components in data center switch 18 to monitor, configure, or otherwise manage the components. For example, management system 36 may provide command line interface (CLI), simple network management protocol (SNMP), and system log functionality into data center switch 18 for administrator 38.

For example, access switches 34 or distribution switches 32 may receive network messages from management system 36 via SNMP. Upon receiving a network message, the managed component may provide information based on a monitoring request in the network message or modify its current configuration based on configuration data in the network message. For example, the monitoring request may ask the managed component to report its connectivity to other switches in data center switch 18 and/or the traffic distribution across its links. As another example, the configuration data may comprise a request to perform an update of the managed component.

As described above with respect to FIG. 1, each of access switches 34 of data center switch 18 may operate as an FCoE transit switch between Enode 22 of server 20 and FCF 26 of SAN 24. The FCoE standard requires a point-to-point link between Enode and FCF 26. In order to emulate the point-to-point link, each of access switches 34 of data center switch 18 includes FIP and FCoE traffic filters and sends all FIP and FCoE request and response pairs over the same virtual link.

Conventionally, access switches included in a data center switch configured as an FCoE transit switch do not support a LAG with an Enode of a server because the access switches are not able to emulate the point-to-point links used by native Fibre Channel over a LAG. Since a LAG is treated as a single logical interface, the access switches are not able to identify a specific virtual interface included in the LAG and, thus, cannot send all FIP and FCoE request and response pairs over the same virtual link.

The techniques of this disclosure support FCoE LAGs in data centers, such as data center 16 of FIG. 1, by enabling access switches 34 included in data center switch 18 to assign class identifiers to each member link included in FCoE LAG 23 between Enode 22 of server 20 and one or more of access switches 34 of data center switch 18. In this way, access switches 34 are able to redirect FCoE traffic from FCF 26 toward Enode 22 on the correct member link of FCoE LAG 23. In addition, the techniques of this disclosure enable scaling of FIP and FCoE sessions by installing FIP snooping filters in IFPs in the forwarding plane of each of access switches 34 to avoid session limitations of VFPs. For example, each of access switches 34 may include an IFP filter rule based on a source MAC address hit determination to provide FIP snooping filtering in order to only allow FCoE packets from Enodes that are logged-in to FCF 26 of SAN 24.

Figure 3:
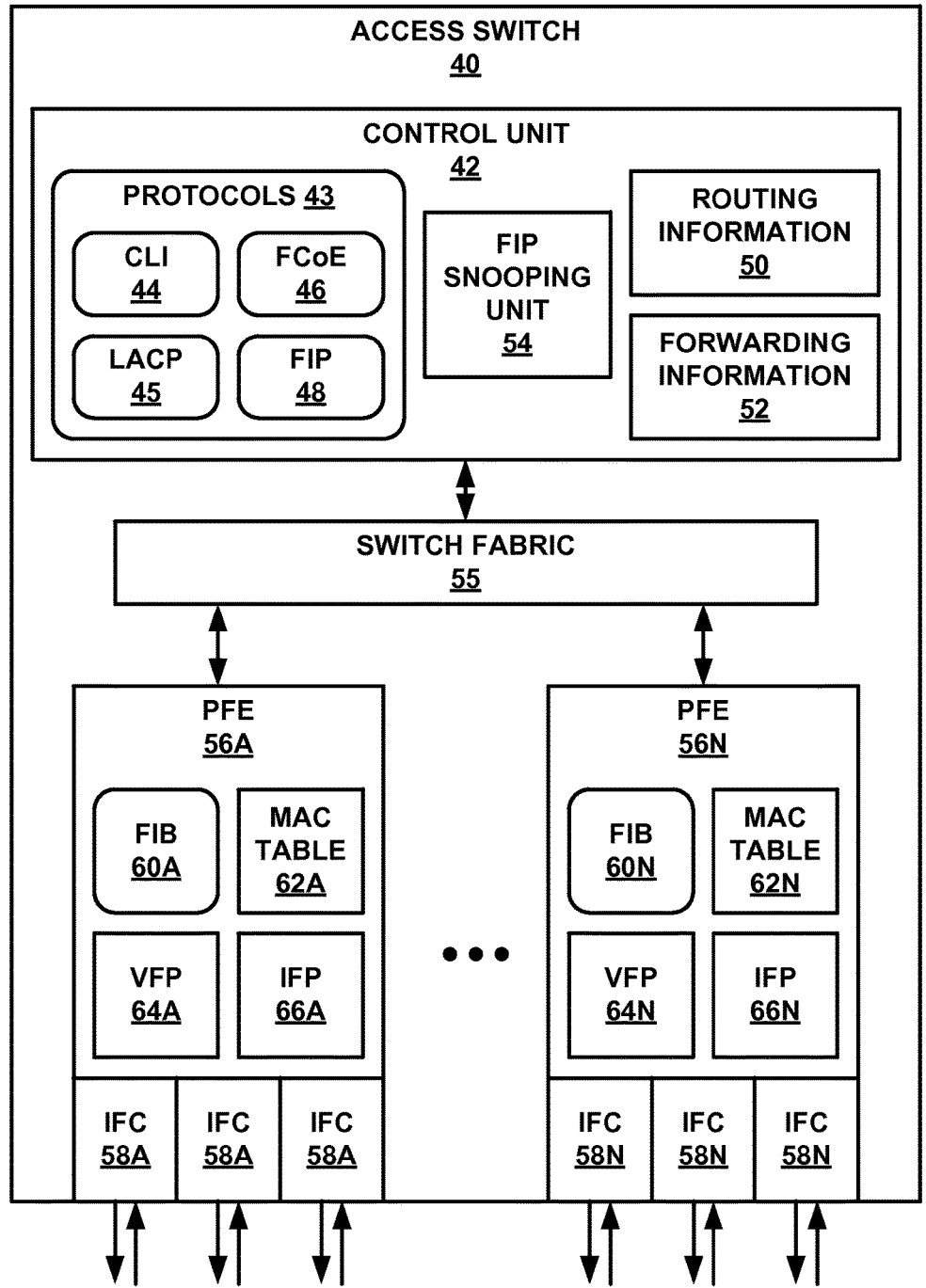
FIG. 3 is a block diagram illustrating an example of an access switch of a data center switch configured to operate as an FCoE transit switch.

FIG. 3 is a block diagram illustrating an example of an access switch 40 of a data center switch, such as data center switch 18 from FIG. 1 and FIG. 2, configured to operate as an FCoE transit switch. As one example, access switch 40 may comprise an access switch connected to a plurality of other, similar access switches via a data center interconnect in a single-layer data center switch substantially similar to data center switch 18 from FIG. 2. As another example, access switch 40 may comprise an access switch connected to a plurality of aggregate switches in a multi-tier data center switch. Regardless of the architecture of the data center switch, access switch 40 includes multiple ports connected to at least one server, such as server 20 from FIG. 1, and at least one FCF of a SAN, such as FCF 26 of SAN 24 from FIG. 1.

In the illustrated example of FIG. 3, access switch 40 includes a control unit 42 that provides control plane functionality for the network device. Access switch 40 also includes switch fabric 55 interconnecting a set of packet-forwarding engines 56A-56N ("PFEs 56") that send and receive traffic by a set of interface cards 58A-58N ("IFCs 58") that typically have one or more physical network interface ports. PFEs 56 and switch fabric 55 collectively provide a forwarding plane for forwarding network traffic. Switch fabric 55 provides a high-speed interconnect for packet switching and forwarding incoming data packets between PFEs 56 for transmission over a network.

As shown in FIG. 3, each of PFEs 56 includes one of forwarding information bases (FIBs) 60A-60N ("FIBs 60") that stores forwarding data structures installed by control unit 42. In addition, each of PFEs 56 includes one of Media Access Control (MAC) tables 62A-62N ("MAC tables 62") that maps MAC addresses of remote network devices to associated ports on IFCs 58 on a per Virtual Local Area Network (VLAN) basis. Each of MAC tables 62 are maintained by the respective PFEs 56 in the transport layer and are not distributed in IFCs 58 on a per port basis. Each of PFEs 56 also includes one of VLAN filter processors (VFPs) 64A-64N ("VFPs 64") and one of ingress filter processors (IFPs) 66A-66N (IFPs 66). VFPs and IFPs comprise access control lists (ACLs) or firewall filters used to determine whether to allow traffic to pass through access switch 40. Although not shown in FIG. 3, PFEs 56 may each comprise a central processing unit (CPU), memory and one or more programmable packet-forwarding application-specific integrated circuits (ASICs).

Control unit 42 provides an operating environment for various protocols 43 that perform control plane functions for access switch 40. Control unit 42 also may include one or more daemons that comprise user-level processes that run network management software, execute routing protocols to communicate with peer routers or switches, maintain and update one or more routing tables, and create one or more forwarding tables for installation to PFEs 56, among other functions. In the illustrated example of FIG. 3, control unit 42 includes FCoE protocol 46 and FIP 48. In accordance with the techniques described in this disclosure, access switch 40 operates as an FCoE transit switch between an Enode of a server, such as Enode 22 of server 20 from FIG. 1, and a FCF of a SAN, such as FCF 26 of SAN 24. In this example, access switch 40 may operate as merely a passthrough switch to transparently forward FIP and FCoE packets between the Enode and the FCF. Control unit 42 of access switch 40, therefore, may not use FCoE protocol 46 and FIP 48 to establish and actively participate in FCoE sessions. Instead, control unit 42 may use FCoE protocol 46 and FIP 48 to recognize the FIP and FCoE packets that pass through access switch 40.

As one example, control unit 42 includes FIP snooping unit 54 to monitor FIP messages including logins, solicitations and advertisements that pass through access switch 40 in order to learn MAC addresses assigned to VN ports on the Enode and FCF ports on the FCF. Upon learning the MAC addresses, control unit 42 installs the learned MAC addresses into entries in one or more of MAC tables 62. As another example, PFEs 56 of access switch 40 include VFPs 64 and IFPs 66 to filter FIP and FCoE packets to determine whether the packets are allowed to pass through access switch 40.

Control unit 42 includes a command-line interface ("CLI") 44. CLI 44 provides a shell by which an administrator, such as administrator 38 from FIG. 2, may modify the configuration of access switch 40 using text-based commands. In other examples, an administrator may modify the configuration of access switch 40 via a network management system (NMS) or a software-defined network (SDN) controller. Control unit 42 also includes link aggregation control protocol (LACP) 45 that operates to form an FCoE LAG interface that bundles physical and virtual interfaces together to be treated as a single logical interface on IFCs 58. LACP 45 may bundle the physical and virtual interfaces on IFCs 58 associated with physical and virtual links between access switch 40 and an Enode into the FCoE LAG. In some examples, an administrator may use CLI 44 to select a set of physical and virtual interfaces to be included in the FCoE LAG that transports FCoE traffic and IP traffic.

Control unit 42 maintains routing information 50 that defines routes to destinations within the network and topology data that represents the overall topology of the network. Routing information 50 may include, for example, route data that describes various routes within the network, and corresponding next hop data indicating appropriate neighboring devices within the network for each of the routes. Access switch 40 updates routing information 50 based on received advertisements to accurately reflect the topology of the network. Based on routing information 50, control unit 42 generates forwarding information 52 and installs forwarding data structures into FIBs 60 within PFEs 56 in the forwarding plane. FIBs 60 associate network destinations with specific next hops and corresponding interface ports within the forwarding plane.

Control unit 42 of access router 40 may also include one or more daemons (not shown) that identify individual programs for compilation and instantiation as forwarding data structures in FIBs 60 to perform forwarding plane functionality of access switch 40. The programs may specify functions to be performed on the packet, including fundamental packet forwarding operations such as input packet processing, route lookup, and output packet processing, as well as service functions such as packet filtering or access control, statistical sampling, traffic policing, rate limiting, and accounting. The daemons select the appropriate forwarding data structures for installation in FIBs 60 of PFEs 56 to establish packet forwarding paths and provide lookup data. Additional information regarding packet forwarding path programming is available in PACKET FORWARDING PATH PROGRAMMING USING A HIGH-LEVEL DESCRIPTION LANGUAGE, U.S. application Ser. No. 13/194,571, filed Jul. 29, 2011, which is incorporated herein by reference in its entirety.

In the example of FIG. 3, control unit 42 is connected to each of PFEs 56 by a dedicated internal communication link and switch fabric 55. For example, the dedicated link may comprise a 200 Mbps or Gigabit Ethernet connection for internal communication between the multiple components of access switch 40. In one embodiment, control unit 42 communicates data representative of FIBs 60 into PFEs 56 to program the PFEs 56 and thereby control forwarding of traffic by the corresponding components within the forwarding plane. This allows FIBs 60 stored in memory (e.g., on-chip RAM) in PFEs 56 to be updated without degrading packet-forwarding performance of access switch 40. In some instances, control unit 42 may derive a separate and different one of FIBs 60 for each of the respective PFEs 56. In addition, one or more of PFEs 56 may include packet-forwarding ASICs (not shown in FIG. 3) that PFEs 56 program with a hardware-copy FIB based on the one of FIBs 60 (i.e., hardware versions of the software FIBs) in each of the respective PFEs 56.

PFEs 56 process packets by performing a series of operations on each packet over respective internal packet forwarding paths as the packets traverse the internal architecture of access switch 40. Operations may be performed, for example, on each packet by any of a corresponding ingress interface port, an ingress one of PFEs 56, an egress one of PFEs 56, an egress interface port or other components of access switch 40 to which the packet is directed prior to egress. PFEs 56 each include forwarding data structures within FIBs 56 that, when executed, examine the contents of each packet and on that basis make forwarding decisions, apply filters (such as those of VFPs 64 and IFPs 66), and/or perform accounting, management, traffic analysis, and load balancing, for example. The result of packet processing determines the manner in which a packet is forwarded or otherwise processed by PFEs 56 from its ingress interface port on one of IFCs 58 to its egress interface port on one of IFCs 58.

As described above, access switch 40 operates as an FCoE transit switch to transport FIP and FCoE traffic between an Enode of a server and a FCF of a SAN. In general, each source MAC entry in MAC tables 62 is assigned a class identifier (ID), and each FCoE packet that includes a matching source MAC entry is assigned the class ID associated with that source MAC entry. For example, each FCF dynamically discovered by access switch 40 using FIP snooping unit 54 is assigned a unique forwarding class ID. Each VN port of a given Enode is assigned a unique MAC address provided by the FCF where the Enode has performed login. The VN port MAC addresses are programmed into the MAC tables 62 as static learned MAC addresses on un-trusted ports.

Conventionally, each of the VN port MAC addresses is assigned the same forwarding class ID associated with the FCF where the device has performed login, and the assigned forwarding class ID is programmed into MAC tables 62. For example, assuming the FCF has a MAC address of 30:10:94:01:00:00, and that the FCF assigned 56 as the forwarding class ID and assigned the VN port MAC address as 0e:fc:00:01:0a:01, the entry in MAC tables 62 will look like the following:

| MAC | ForwardingClassID (SrcClassL2) |
|---|---|
| 0e:fc:00:01:0a:01 | 56 |

In this case, the forwarding class ID assigned to the VN port MAC addresses of the Enode may be considered a source class ID (i.e., SrcClassL2) associated with the FCF when transporting traffic from the FCF toward the Enode. When the source class ID is used as a match condition in a filter to drop the FCoE traffic coming from the Enode towards the FCF, there is no way to redirect the FCoE traffic from the FCF to the correct member link of an FCoE LAG bundle towards the Enode.

In accordance with the techniques of this disclosure, access switch 40 supports FCoE LAGs in data centers by assigning class IDs to each member link included in an FCoE LAG interface on IFCs 58 of access switch 40, and installing the assigned class IDs in MAC tables 62 with associated destination MAC addresses assigned to VN ports on the Enode. For example, when a first FIP packet is received from an Enode, PFE 56A assigns a class ID to a member link of the FCoE LAG interface on which the first FIP packet is received from the Enode. Access switch 40 may use FIP snooping unit 54 to determine when the first FIP packet has been received from the Enode. The first FIP packet received from the Enode may be used to perform discovery of other FCoE devices in data center 16. Other FIP packets received from the Enode may be used to perform a fabric login to a discovered FCF of a SAN.

When a fabric login acceptance message is received from the FCF for a VN port on the Enode that is connected to the member link of the FCoE LAG interface, PFE 56A associates the class ID assigned to the member link with a destination MAC address assigned to the VN port on the Enode by the FCF. PFE 56A then programs the destination MAC address of the VN port and the associated class ID in MAC table 60A included in PFE 56A. The class ID is then used to identify the correct member link of the FCoE LAG interface on which to transport FCoE traffic received from the FCF and destined for the destination MAC address of the VN port on Enode. In this way, the forwarding plane of access switch 40 is able to redirect FCoE traffic from the FCF of the SAN toward the Enode on the server on the correct member link of the FCoE LAG.

In addition, the techniques of this disclosure enable scaling of FIP and FCoE sessions by installing FIP snooping filters in IFPs 66 in the forwarding plane of access switch 40 to avoid session limitations associated with only using VFPs 64 to filter FCoE packets. VFPs 64 are pre-ingress content-aware processors that are typically positioned first in a packet processing pipeline. Each of VFPs 64 has a ternary content-addressable memory (TCAM) space that stores entries for filters to be applied to FIP and FCoE packets received from an Enode. Conventionally, VFPs 64 include FIP snooping filters. The VFP TCAMs, however, have limited space and severe session limitations, e.g., 376 FIP and FCoE sessions.

If access switch 40 is capable of supporting FCoE LAGs, the number of FIP and FCoE sessions passing through access switch 40 will substantially increase. According to the techniques of this disclosure, to scale the FIP and FCoE sessions on access switch 40, the FIP snooping filter design may be installed in IFPs 66 in order to limit the entries in VFPs 64, which have limited TCAM space. IFPs 66 are the main ingress content-aware processors that are typically positioned after VFPs 64 in the packet processing pipeline. By installing FIP snooping filters in IFPs 66, the techniques may enable scaling of the FIP and FCoE sessions, e.g., up to 2500 FIP and FCoE sessions. As an example, IFPs 66 may include an IFP filter rule based on a source MAC address hit determination, i.e., whether the source MAC address is matched or installed in MAC tables 62, to provide FIP snooping filtering in order to only allow FCoE packets from Enodes that are logged-in to the FCF of the SAN. VFPs 64 and IFPs 66 may be optimized to accommodate a large number of FIP and FCoE sessions and/or Enodes, but have a restriction on the number of FCFs.

To support FCoE LAG and scale more FIP Sessions, the techniques of this disclosure include modifying a filter design, removing the source class ID from the existing filter design in order to redirect FCoE traffic using a destination class ID (i.e., DestClassL2) associated with a VN port of the Enode when transporting traffic from the FCF toward the Enode, and using a source MAC address hit (i.e., L2SrcHit) to provide FIP Snooping functionality. In accordance with the techniques, each member link that is included in the FCoE LAG interface is assigned a class ID (i.e., Dest-ClassL2). Once a class ID is assigned to a given member link, a filter rule installed in IFPs 66 establishes a binding of the class ID to the port on IFCs 58 associated with the member link. The filter rules installed in IFPs 66 forward the FCoE traffic to the correct port based on the class ID determined from MAC tables 66 during a destination MAC address lookup. These rules may have higher priority than any of the other rules installed in IFPs 66. In addition, as described above, the VN port MAC addresses are programmed into the MAC tables 66 as static learned MAC addresses by control unit 42. Any FCoE packet received from an unknown VN port of the Enode, therefore, will be dropped by the filter rules in IFPs 66 because the source MAC address does not match any entry in MAC tables 66 (i.e., the L2SrcHit condition would fail).

Example filter rules installed in VFPs 64 for initializing a FIP Snooping enabled VLAN are described below.
Event: FIP Snooping VLAN is getting initialized.

```
filter_vlan(vlanindex)_scaling {
R1. rule_fcoe_sapre_fipacc_vfp {
   match {
      SMAC=sapre-prefix,
      EtherType=FIP,
      VLAN=FSVLAN index,
      PortClassID=UntrustedClassID
   }
   action {
      Allow
   }
}
/* The first filter rule, R1, installed in VFPs 64 allows FIP packets, such as keep alive (KA) packets, received from Enodes to be forwarded to an FCF. */
R2. rule_fcoe_sapre_deny_vfp {
   match {
      SMAC=sapre-prefix,
      VLAN=FSVLAN index,
      PortClassID=UntrustedClassID
   }
   action {
      Drop
   }
}
/* The second filter rule, R2, installed in VFPs 64 drops any packets other than FIP packets
   received from Enodes. */
R3. rule_fcoe_deny_vfp {
   match {
      EtherType=FCoE,
      VLAN=FSVLAN index,
      PortClassID=UntrustedClassID
   }
   action {
      Drop
   }
}
/* The third filter rule, R3, installed in VFPs 64 drops FCoE packets destined for an unlearned FCF and received from an Enode that has not yet performed login to the FCF. */
R4. rule_fcoe_default {
   match {
      default-match-condition
   }
   action {
      Allow
   }
}
```

```
/* The fourth filter rule, R4, installed in VFPs 64 allows all
other traffic that does not fall into one of the above rules to
pass through VFPs 64. */
}
```

In accordance with the techniques of this disclosure, the following filter rules for FCoE traffic upon learning/snooping a new FCF may be divided between IFPs 66 and VFPs 64 to avoid the session limitations on VFPs 64 and enable scaling of FIP and FCoE sessions.

Two general filter rules are described first, followed by example filter rules installed in VFPs 64 and IFPs 66.

Event: On learning of new FCF.

```
filter_vlan(FSVLAN_vlan_index_scaling {
  rule_fcf_accept {
    match {
      DMAC=FCF_MAC,
      EtherType=FCoE,
      VLAN=FSVLAN index,
      L2SrcHit=yes
      SMAC=sapre-prefix
    }
    action {
      Allow
    }
  }
/* The first general filter rule allows FCoE traffic received
from Enodes that have performed login to a known FCF. */
  rule_fcf_drop {
    match {
      DMAC=FCF_MAC,
      EtherType=FCoE,
      VLAN=FSVLAN index,
      PortClassID=UntrustedClassID
    }
    action {
      Drop
    }
  }
/* The second general filter rule drops FCoE traffic destined
for the known FCF from an Enode that has not yet per-
formed login to the known FCF. */
}
```

The two general filter rules described above may be expanded to VFPs 64 as follows.

The fifth filter rule, R5, installed in VFPs 64 filters an FCoE packet based on whether the destination MAC address (DMAC) included in the FCoE packet identifies a known or learned FCF. According to the fifth filter rule, if the destination MAC address in the FCoE packet identifies a known or learned FCF, VFPs 64 assign a VFP class ID to the FCoE packet and allow the FCoE packet to pass to a MAC table lookup process. The VFP class ID (i.e., FCF_VFP_SrcClassField_id) is an internal field used to tag the FCoE packet in VFPs 64 when the DMAC address in the FCoE packet identifies a known FCF, and used as a match condition in IFPs 66.

```
R5. rule_fcf_accept_vfp {
  match {
    DMAC=FCF_MAC,
    EtherType=FCoE,
    VLAN=FSVLAN index
  }
  action {
    Assigns   SrcClassField(FCF_VFP_SrcClassField_id)
       to the packet
```

```
/* This is an internal field used to tag the packet in VFP
upon matching other conditions in VFP. This field is
used as a match condition in IFP.*/
  }
}
```

The sixth filter rule, R6, installed in VFPs 64 filters an FCoE packet based on whether the source MAC address (SMAC) included in the FCoE packet is spoofed. For example, according to the sixth filter rule, if the received FCoE packet includes a source MAC address that identifies a known or learned FCF, VFPs 64 identify the FCoE packet as having a spoofed FCF port address as the source MAC address from the Enode. In this case, the FCoE packet is dropped.

```
R6. rule_fcf_smac_deny_vfp {
  match {
    SMAC=FCF_MAC,
    VLAN=FSVLAN index,
    PortClassID=UntrustedClassID
  }
  action {
    Drop
  }
}
```

In the MAC table lookup process, PFEs 56 perform a lookup in MAC tables 60 based on the source MAC address for a VN port on an Enode included in the FCoE packet. Based on the lookup, PFEs 56 determine whether the source MAC address included in the FCoE packet is a "source MAC hit" (i.e., matches a source MAC address installed in an entry of MAC tables 60s). If the source MAC address in the FCoE packet is a source MAC hit, control unit 42 assigns a forwarding class ID (i.e., FCF_ForwardingClass_id) to the FCoE packet.

The MAC table lookup process described below is a normal L2 lookup and is not a filter rule. For the sake of understanding, however, the MAC table lookup is written as a filter rule.

```
match {
  SMAC=VN Port Mac,
  VLAN=FSVLAN index
}
actions {
  Assigns   ForwardingClassID(FCF_ForwardingClass_id)
     to the packet.
}
```

The two general filter rules described above may be expanded to IFPs 66 as follows.

The seventh filter rule, R7, installed in IFPs 66 filters the FCoE packet based on whether the source MAC address in the FCoE packet is a source MAC hit in MAC tables 60. For example, when the source MAC address in the FCoE packet is a source MAC hit, it indicates that the Enode from which the FCoE packet is received is logged-in to the learned or known FCF, and IFPs 66 allow the FCoE packet to be forwarded to the learned or known FCF.

```
R7. rule_fcf_accept_ifp {
  match {
    DMAC=FCF_MAC,
    EtherType=FCoE,
    VLAN=FSVLAN index,
    L2SrcHit=yes
    SMAC=sapre-prefix
  }
  action {
    Allow
  }
}
```

The eighth filter rule, R8, installed in IFPs 66 filters the FCoE packet based on whether the source MAC address in the FCoE packet is a source MAC hit in MAC tables 60 and based on the VFP class ID assigned to the FCoE packet by VFPs 64. For example, when the source MAC address in the FCoE packet is not a source MAC hit and the VFP class ID is assigned to the FCoE packet, it indicates that the Enode from which the FCoE packet is received is not logged-in to the learned or known FCF 26, and IFPs 66 drop the FCoE packet.

```
R8. rule_fcf_drop_ifp {
    match {
        SrcClassField=FCF_VFP_SrcClassField_id,
        PortClassID=UntrustedClassID
    }
    action {
        Drop
    }
}
```

In this way, the techniques of this disclosure support scaling of FIP and FCoE sessions on an access switch 40 included in a data center switch by installing FIP snooping filters in IFPs 66 to avoid the session limitations of 376 FCoE sessions on VFPs 64. As described above, the techniques of this disclosure use the source MAC hit determination in IFPs 66 to provide FIP snooping on access switch 40 to only allow FCoE packets from Enodes that are logged-in to a learned or known FCF. With this filter design, the techniques may enable a data center switch to scale up to 2500 FIP and FCoE sessions in some examples and support FCoE LAG interfaces. Furthermore, the techniques of this disclosure enable control unit 42 to assign class IDs to each member link included in the FCoE LAG interface between an Enode and access switch 40. In this way, the techniques of this disclosure support FCoE LAGs in data centers by enabling access switch 40 to redirect FCoE packets received from a learned or known FCF 26 destined for a VN node on the Enode using the correct member link of the FCoE LAG interface on IFCs 58.

The architecture of ingress router 40 illustrated in FIG. 3 is shown for exemplary purposes only. The disclosure is not limited to this architecture. In other embodiments, ingress router 40 may be configured in a variety of ways. In one embodiment, for example, some of the functionally of control unit 42 may be distributed within PFEs 48. The operating environment of control unit 42 may be implemented solely in software, or hardware, or may be implemented as a combination of software, hardware or firmware. For example, control unit 42 may include one or more processors, one or more microprocessors, digital signal processors (DSPs), application specific integrated circuits (ASICs), application specific special processors (ASSP), field programmable gate arrays (FPGAs), or any other equivalent integrated or discrete logic circuitry, or any combination thereof, which execute software instructions. In that case, control unit 42 may include various software modules or daemons executing on an operating system, and may include executable instructions stored, embodied, embedded, or encoded in a non-transitory computer-readable storage medium, such as computer memory or hard disk. Instructions stored in a computer-readable medium may cause a programmable processor, or other processor, to perform methods described herein, e.g., when the instructions are executed.

Computer-readable storage media may include random access memory (RAM), read only memory (ROM), programmable read only memory (PROM), erasable programmable read only memory (EPROM), electronically erasable programmable read only memory (EEPROM), non-volatile random access memory (NVRAM), flash memory, a hard disk, a CD-ROM, a floppy disk, a cassette, a solid state drive, magnetic media, optical media, or other computer-readable media. Computer-readable media may be encoded with instructions corresponding to various aspects of ingress router 40, e.g., protocols. Control unit 42, in some examples, retrieves and executes the instructions from memory for these aspects.

FIG. 4 is a conceptual diagram illustrating an example MAC table 80 within a forwarding engine of an access switch of a data center switch configured to operate as an FCoE transit switch. In some examples, MAC table 80 may operate substantially similar to MAC tables 62 within PFEs 56 of access switch 40 from FIG. 3. As illustrated in FIG. 4, MAC table 80 includes multiple entries 82, 84, 86 and 88, with each of the entries including a VLAN ID, a MAC address, an interface ID, and a class ID. In other examples, MAC table 80 may include additional information for each entry, such as a MAC address learning state or a MAC address type (e.g., static or dynamic).

As one example, entry 82 of MAC table 80 identifies a known FCF, such as FCF 26 of SAN 24. As illustrated in FIG. 4, entry 82 includes a VLAN ID of VLAN1, a MAC address of FCF_MAC, an interface ID of Port A, and a class ID of FCID1. In this example, VLAN1 is the FCoE VLAN provisioned on Port A of the access switch and FCF_MAC is the MAC address assigned to an FCF port of the FCF that is connected to Port A of the access switch. FCID1 identifies the unique forwarding class assigned to the FCF upon discovery during FIP snooping performed by the access switch.

Entries 84, 86 and 88 of MAC table 80 identify different VN ports of an Enode, such as Enode 22 of server 20 from FIG. 1, logged-in to the FCF. In general, each VN port of an Enode has a MAC address assigned by the FCF where the Enode has performed login. Conventionally, the access switch assigns the same forwarding class ID as the FCF to each of the VN port MAC addresses. In this scenario, however, the access switch has no way of identifying a specific member link of a FCoE LAG, such as FCoE LAG 23 from FIG. 1, for each of the VN ports on the Enode.

In accordance with the techniques described in this disclosure, the access switch assigns a unique class ID to each member link included in the FCoE LAG between the access switch and the Enode. In this way, the access switch is able to redirect FCoE traffic from the FCF toward the Enode on the correct member link of the FCoE LAG. As illustrated in FIG. 4, each of entries 84, 86 and 88 includes a VLAN ID of VLAN1 and an interface ID of FCoE LAG. In this example, VLAN1 is the FCoE VLAN provisioned on the FCoE LAG interface of the access switch. Entry 84 includes a unique MAC address of VN_MAC1 assigned to a first VN port of the Enode connected to the access switch via the FCoE LAG, and a unique class ID of DestClassID1 that identifies the member link of the FCoE LAG interface for the first VN port of the Enode identified by VN_MAC1. Entry 86 includes a unique MAC address of VN_MAC2 assigned to a second VN port of the Enode, and a unique class ID of DestClassID2 that identifies the member link of the FCoE LAG interface for the second VN port. Moreover, Entry 84 includes a unique MAC address of VN_MAC1 assigned to a third VN port of the Enode, and a unique class ID of DestClassID3 that identifies the member link of the FCoE LAG interface for the third VN port.

Figure 5:
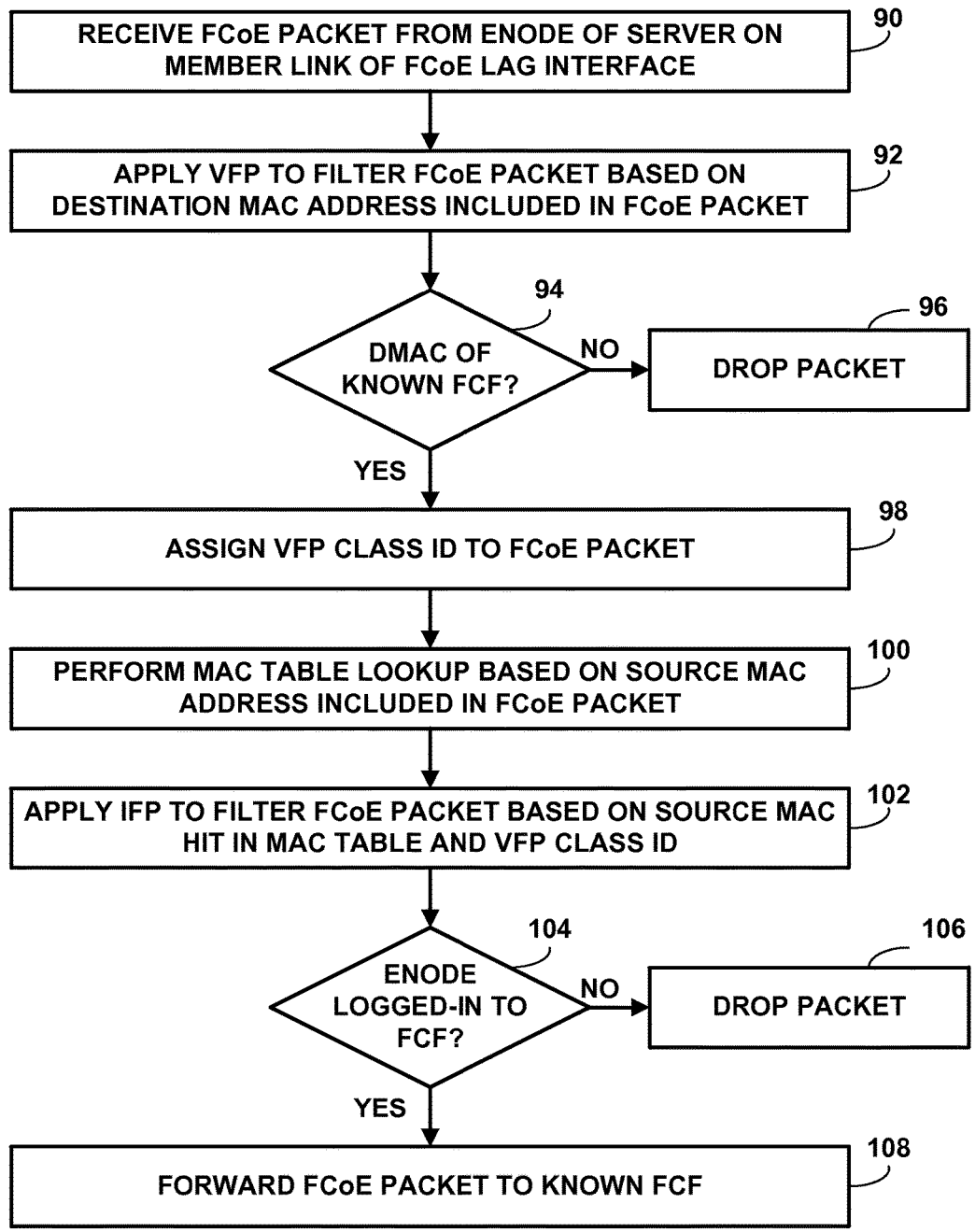
FIG. 5 is a flowchart illustrating an example operation of filtering FCoE packets received on an FCoE link aggregation group (LAG) from an FCoE node of a server and destined for a Fibre Channel forwarder (FCF) of a SAN.

FIG. 5 is a flowchart illustrating an example operation of filtering FCoE packets received on an FCoE link aggregation group (LAG) from an FCoE node of a server and destined for a Fibre Channel forwarder (FCF) of a SAN. The example operation is described herein with reference to access switch 40 from FIG. 3. For purposes of explanation, it may be assumed that access switch 40 is included in data center switch 18 from FIG. 1. In other examples, the operation may be performed by any of access switches 34 in data center switch 18 from FIG. 2.

A port on PFE 56A of access switch 40 receives an FCoE packet from a VN port on Enode 22 of server 20 on a member link of FCoE LAG 23 (90). The FCoE packet has a packet header that includes a VLAN ID, a source MAC address and a destination MAC address. The VLAN ID identifies the VLAN of the FCoE packet, the source MAC address identifies the VN port on Enode 22 from which the FCoE packet was received, and the destination MAC address identifies a FCF port on FCF 26 of SAN 24 to which the packet is destined.

PFE 56A applies VFP 64A to filter the FCoE packet based on the destination MAC address included in the FCoE packet (92). VFP 64 determines whether the destination MAC address included in the FCoE packet identifies a known or learned FCF. If the destination MAC (DMAC) address in the FCoE packet does not identify a known FCF (NO branch of 94), VFP 64A drops the FCoE packet (96). For example, if the received FCoE packet includes a source MAC address that identifies the FCF port on FCF 26, VFP 64A identifies the FCoE packet as having a spoofed FCF port address as the source MAC address from Enode 22. In this case, the FCoE packet is dropped because the destination MAC address does not identify a known FCF, e.g., FCF 26.

If the DMAC address in the FCoE packet identifies a known FCF (YES branch of 95), VFP 64A assigns a VFP class ID to the FCoE packet (98). As described above, the VFP class ID (i.e., FCF_VFP_SrcClassField_id) is an internal field used to tag the FCoE packet in VFP 64A when the DMAC address in the FCoE packet identifies a known FCF, and used as a match condition in IFP 66A. VFP 64A also allows the FCoE packet to pass to the MAC table lookup PFE 56A.

VFP 64A performs a lookup in MAC table 60A included in PFE 56A based on the source MAC address included in the FCoE packet (100). Based on the lookup, PFE 56A determines whether the source MAC address included in the FCoE packet is a "source MAC hit," i.e., matches an entry in MAC table 60A identifying a known or learned source MAC address. PFE 56A then applies IFP 66A to filter the FCoE packet based on whether the source MAC address in the FCoE packet is a source MAC hit in MAC table 60A and based on the VFP class ID assigned to the FCoE packet by VFP 64A (102).

When the source MAC address in the FCoE packet is not a source MAC hit and the VFP class ID is assigned to the FCoE packet, it indicates that Enode 22 from which the FCoE packet was received is not logged-in to known FCF 26 (NO branch of 104) and IFP 66A drops the FCoE packet (106). When the source MAC address in the FCoE packet is a source MAC hit, it indicates that Enode 22 from which the FCoE packet was received is logged-in to known FCF 26 (YES branch of 104) and IFP 66A allows the FCoE packet to be forwarded to FCF 26. PFE 56A then performs packet switching to forward the FCoE packet to the FCF port on known FCF 26 identified by the destination MAC address in the FCoE packet (108).

In this way, the techniques of this disclosure support scaling of FIP and FCoE sessions on access switch 40 by installing FIP snooping filters in IFPs 66 to avoid the session limitations of VFPs 64. As described above, the techniques of this disclosure use the source MAC hit determination in IFPs 66 to provide FIP snooping filtering on access switch 40 to only allow FCoE packets from Enodes that are logged-in to FCF 26. Furthermore, the techniques of this disclosure enable control unit 42 to assign class IDs to each member link included in the FCoE LAG interface between Enode 22 of server 20 and access switch 40. In this way, the techniques of this disclosure support FCoE LAGs in data centers by enabling access switch 40 redirect FCoE packets received from FCF 26 destined for a VN port on Enode 22 using the correct member link of FCoE LAG 23.

Figure 6:
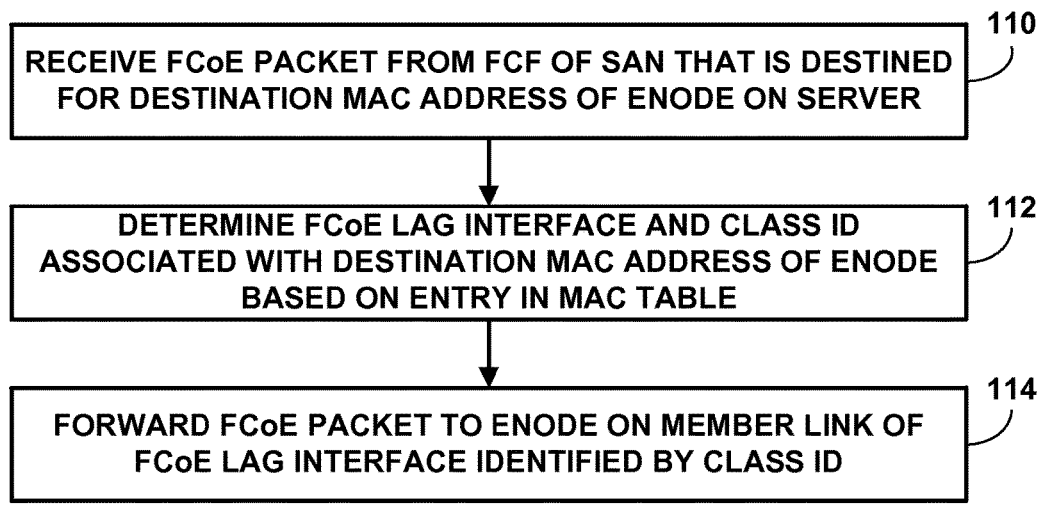
FIG. 6 is a flowchart illustrating an example operation of redirecting FCoE packets from a FCF of a SAN toward an FCoE node of server over an FCoE LAG.

FIG. 6 is a flowchart illustrating an example operation of redirecting FCoE packets from FCF 26 of SAN 24 toward Enode 22 of server 20 over FCoE LAG 23. The example operation is described herein with reference to access switch 40 from FIG. 3. For purposes of explanation, it may be assumed that access switch 40 is included in data center switch 18 from FIG. 1. In other examples, the operation may be performed by any of access switches 34 in data center switch 18 from FIG. 2.

A port on PFE 56A of access switch 40 receives an FCoE packet from a FCF port on FCF 26 of SAN 24 destined for a destination MAC address of Enode 22 on server 20 (110). The FCoE packet has a packet header that includes a VLAN ID, a source MAC address and the destination MAC address. The VLAN ID identifies the VLAN of the FCoE packet, the source MAC address identifies the FCF port from which the FCoE packet was received, and the destination MAC address identifies a VN port on Enode 22 to which the packet is destined.

PFE 56A determines an FCoE LAG interface and a class ID associated with the destination MAC address of Enode 22 based on an entry for the destination MAC address in MAC table 60A included in PFE 56A (112). For example, PFE 56A performs a lookup in MAC table 60A using the destination MAC address included in the FCoE packet to determine the FCoE LAG interface and the class ID associated with the destination MAC address. The FCoE LAG interface comprises an interface for FCoE LAG 23 between Enode 22 of server 20 and access switch 40 of data center switch 18. The FCoE LAG interface aggregates a plurality of member links between a plurality of VN ports on Enode 22 and access switch 40. The class ID comprises an identifier assigned to the member link of the FCoE LAG interface for the VN port on Enode 22 that is identified by the destination MAC address.

As described above, PFE 56A assigns the class ID to the member link of the FCoE LAG interface when a first FIP packet is received on the member link from Enode 22 to perform discovery and login. The class ID is associated with the destination MAC address of the VN port on Enode 22 when a fabric login acceptance is received from FCF 24 for the VN port identified by the destination MAC address. The class ID is then programmed with the destination MAC address of the VN port in MAC table 60A included in PFE 56A, and used to identify the correct member link on which to transport FCoE traffic received from FCF 24 and destined for the destination MAC address of the VN port on Enode 22.

Upon determining the FCoE LAG interface and the class ID for the destination MAC address included in the FCoE packet, PFE 56A performs packet switching to forward the FCoE packet to Enode 22 on the member link of the FCoE LAG interface identified by the class ID (114). In this way, the techniques of this disclosure support FCoE LAGs in data centers by enabling access switch 40 to emulate a point-to-point connection between Enode 22 of server 20 and FCF 26 of SAN 24 over FCoE LAG 23.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples of the invention have been described. These and other examples are within the scope of the following claims.

What is claimed is:

1. A method comprising:
establishing, by an access switch of a data center, a plurality of virtual links that emulate point-to-point physical links between a Fibre Channel forwarder (FCF) of a storage area network (SAN) and a plurality of virtual node (VN) ports on a Fibre Channel over Ethernet (FCoE) node (Enode) of a server, wherein the access switch emulates native Fibre Channel by sending packets associated with the FCF of the SAN and one of the plurality of VN ports on the Enode over the same one of the plurality of virtual links;
receiving, by the access switch and from the FCF of the SAN on the one of the plurality of virtual links, a first Fibre Channel over Ethernet (FCoE) packet destined for a destination media access control (MAC) address of the one of the plurality of VN ports on the Enode;
determining, by the access switch and based on an entry for the destination MAC address in a MAC table of the access switch, a FCoE link aggregation group (LAG) interface and a class identifier associated with the destination MAC address of the one of the plurality of VN ports on the Enode, the class identifier identifying only a single member link of a plurality of member links of the FCoE LAG interface over which FCoE packets destined for the destination MAC address of the one of the plurality of VN ports on the Enode are to be forwarded, wherein the single member link of the plurality of member links of the FCoE LAG interface comprises a portion of the one of the plurality of virtual links; and
forwarding the first FCoE packet from the access switch to the one of the plurality of VN ports on the Enode on the single member link of the plurality of member links of the FCoE LAG interface, the single member link being identified by the class identifier associated with the destination MAC address of the one of the plurality of VN ports on the Enode.

2. The method of claim 1, prior to receiving the first FCoE packet, further comprising:
receiving, with the access switch on the single member link of the plurality of member links of the FCoE LAG interface and from the one of the plurality of VN ports on the Enode of the server, a first FCoE initialization protocol (FIP) packet;
assigning the class identifier to only the single member link of the plurality of member links of the FCoE LAG interface on which the first FIP packet is received;
receiving, with the access switch and from the FCF of the SAN, a second FIP packet accepting a login of the Enode to the FCF;
associating the class identifier assigned to only the single member link of the plurality of member links of the FCoE LAG interface with the destination MAC address of the one of the plurality of VN ports on the Enode; and
installing the destination MAC address and the class identifier in the entry of the MAC table of the access switch.

3. The method of claim 1, further comprising:
receiving, with the access switch on the FCoE LAG interface and from the one of the plurality of VN ports on the Enode of the server, a second FCoE packet destined for a destination MAC address of the FCF of the SAN;
applying a virtual local area network (VLAN) filter processor (VFP) to the second FCoE packet to determine whether the FCF is a known FCF learned from FCoE initialization protocol (FIP) snooping; and
in response to determining that the destination MAC address of the FCF included in the second FCoE packet identifies the known FCF, allowing the FCoE packet to pass through the VFP to an ingress filter processor (IFP).

4. The method of claim 3, further comprising, in response to determining that the destination MAC address of the FCF included in the second FCoE packet identifies the known FCF, assigning a VFP class identifier to the second FCoE packet, wherein the VFP class identifier is used by the IFP to filter the second FCoE packet.

5. The method of claim 3, further comprising, in response to determining that a source MAC address of the one of the plurality of VN ports on the Enode included in the second FCoE packet identifies the known FCF, determining that the second FCoE packet has a spoofed source MAC address and dropping the second FCoE packet.

6. The method of claim 1, further comprising:
- receiving, with the access switch on the FCoE LAG interface and from the one of the plurality of VN ports on the Enode of the server, a second FCoE packet destined for the FCF of the SAN;
- applying an ingress filter processor (IFP) to the second FCoE packet to determine whether the Enode is logged-in to the FCF; and
- only allowing the second FCoE packet to pass through the IFP when the Enode is logged-in to the FCF.

7. The method of claim 1, further comprising:
- receiving, with the access switch on the FCoE LAG interface from a source MAC address of the one of the plurality of VN ports on the Enode of the server, a second FCoE packet destined for the FCF of the SAN;
- performing a lookup in the MAC table based on the source MAC address of the one of the plurality of VN ports on the Enode included in the second FCoE packet;
- applying an ingress filter processor (IFP) to the second FCoE packet to determine whether the Enode is logged-in to the FCF based on whether the source MAC address of the one of the plurality of VN ports on the Enode included in the second FCoE packet matches an entry of the MAC table;
- when the source MAC address of the one of the plurality of VN ports on the Enode included in the second FCoE packet matches an entry of the MAC table, determining that the Enode is logged-in to the FCF and forwarding the second FCoE packet to the FCF.

8. The method of claim 7, further comprising, when the source MAC address of the one of the plurality of VN ports on the Enode included in the second FCoE packet does not match an entry of the MAC table, determining that the Enode is not logged-in to the FCF and dropping the second FCoE packet.

9. An access switch in a data center, the access switch comprising:
- a memory; and
- one or more processors in communication with the memory and configured to operate as:
  - a control unit configured to establish a plurality of virtual links that emulate point-to-point physical links between a Fibre Channel forwarder (FCF) of a storage area network (SAN) and a plurality of virtual node (VN) ports on a Fibre Channel over Ethernet (FCoE) node (Enode) of a server, wherein the access switch emulates native Fibre Channel by sending packets associated with the FCF of the SAN and one of the plurality of VN ports on the Enode over the same one of the plurality of virtual links, and establish a Fibre Channel over Ethernet (FCoE) link aggregation group (LAG) between the access switch and the plurality of VN ports on the Enode; and
  - a forwarding engine including a media access control (MAC) table, an FCoE LAG interface, and at least one port to receive, from the FCF of the SAN on the one of the plurality of virtual links, a first FCoE packet destined for a destination MAC address of the one of the plurality of VN ports on the Enode of the server, wherein the forwarding engine is configured to:
    - determine, based on an entry for the destination MAC address in the MAC table, the FCoE LAG interface and a class identifier associated with the destination MAC address of the one of the plurality of VN ports on the Enode, the class identifier identifying only a single member link of a plurality of member links of the FCoE LAG interface over which FCoE packets destined for the destination MAC address of the one of the plurality of VN ports on the Enode are to be forwarded, wherein the single member link of the plurality of member links of the FCoE LAG comprises a portion of the one of the plurality of virtual links, and
    - forward the first FCoE packet from the access switch to the one of the plurality of VN ports on the Enode on the single member link of the plurality of member links of the FCoE LAG interface, the single member link being identified by the class identifier associated with the destination MAC address of the one of the plurality of VN ports on the Enode.

10. The access switch of claim 9, wherein, prior to receiving the first FCoE packet, the forwarding engine is configured to:
- receive, on the single member link of the plurality of member links of the FCoE LAG interface and from the one of the plurality of VN ports on the Enode of the server, a first FCoE initialization protocol (FIP) packet;
- assign the class identifier to only the single member link of the plurality of member links of the FCoE LAG interface on which the first FIP packet is received;
- receive, from the FCF of the SAN, a second FIP packet accepting a login of the Enode to the FCF;
- associate the class identifier assigned to only the single member link of the plurality of member links of the FCoE LAG interface with the destination MAC address of the one of the plurality of VN ports on the Enode; and
- install the destination MAC address and the class identifier in the entry of the MAC table of the access switch.

11. The access switch of claim 9, wherein the forwarding engine is configured to:
- receive, on the FCoE LAG interface and from the one of the plurality of VN ports on the Enode of the server, a second FCoE packet destined for a destination MAC address of the FCF of the SAN;
- apply a virtual local area network (VLAN) filter processor (VFP) to the second FCoE packet to determine whether the FCF is a known FCF learned from FCoE initialization protocol (FIP) snooping; and
- in response to determining that the destination MAC address of the FCF included in the second FCoE packet identifies the known FCF, allow the FCoE packet to pass through the VFP to an ingress filter processor (IFP).

12. The access switch of claim 11, wherein, in response to determining that the destination MAC address of the FCF included in the second FCoE packet identifies the known FCF, the forwarding engine is configured to assign a VFP class identifier to the second FCoE packet, wherein the VFP class identifier is used by the IFP to filter the second FCoE packet.

13. The access switch of claim 11, wherein, in response to determining that a source MAC address of the one of the plurality of VN ports on the Enode included in the second FCoE packet identifies the known FCF, the forwarding engine is configured to determine that the second FCoE packet has a spoofed source MAC address and drop the second FCoE packet.

14. The access switch of claim 9, wherein the forwarding engine is configured to:
receive, on the FCoE LAG interface and from the one of the plurality of VN ports on the Enode of the server, a second FCoE packet destined for the FCF of the SAN;
apply an ingress filter processor (IFP) to the second FCoE packet to determine whether the Enode is logged-in to the FCF; and
only allow the second FCoE packet to pass through the IFP when the Enode is logged-in to the FCF.

15. The access switch of claim 9, wherein the forwarding engine is configured to:
receive, on the FCoE LAG interface from a source MAC address of the one of the plurality of VN ports on the Enode of the server, a second FCoE packet destined for the FCF of the SAN;
perform a lookup in the MAC table based on the source MAC address of the one of the plurality of VN ports on the Enode included in the second FCoE packet;
apply an ingress filter processor (IFP) to the second FCoE packet to determine whether the Enode is logged-in to the FCF based on whether the source MAC address of the one of the plurality of VN ports on the Enode included in the second FCoE packet matches an entry of the MAC table;
when the source MAC address of the one of the plurality of VN ports on the Enode included in the second FCoE packet matches an entry of the MAC table, determine that the Enode is logged-in to the FCF and forward the second FCoE packet to the FCF.

16. The access switch of claim 15, wherein, when the source MAC address of the one of the plurality of VN ports on the Enode included in the second FCoE packet does not match an entry of the MAC table, the forwarding engine is configured to determine that the Enode is not logged-in to the FCF and dropping the second FCoE packet.

17. A non-transitory computer-readable storage medium comprising instructions that when executed cause one or more processors to:
establish, by an access switch of a data center, a plurality of virtual links that emulate point-to-point physical links between a Fibre Channel forwarder (FCF) of a storage area network (SAN) and a plurality of virtual node (VN) ports on a Fibre Channel over Ethernet (FCoE) node (Enode) of a server, wherein the access switch emulates native Fibre Channel by sending packets associated with the FCF of the SAN and one of the plurality of VN ports on the Enode over the same one of the plurality of virtual links;
receive, by the access switch and from the FCF of the SAN on the one of the plurality of virtual links, a first Fibre Channel over Ethernet (FCoE) packet destined for a destination media access control (MAC) address of the one of the plurality of VN ports on the Enode;
determine, by the access switch and based on an entry for the destination MAC address in a MAC table of the access switch, a FCoE link aggregation group (LAG) interface and a class identifier associated with the destination MAC address of the one of the plurality of VN ports on the Enode, the class identifier identifying only a single member link of a plurality of member links of the FCoE LAG interface over which FCoE packets destined for the destination MAC address of the one of the plurality of VN ports on the Enode are to be forwarded, wherein the single member link of the plurality of member links of the FCoE LAG interface comprises a portion of the one of the plurality of virtual links; and
forward the first FCoE packet from the access switch to the one of the plurality of VN ports on the Enode on the single member link of the plurality of member links of the FCoE LAG interface, the single member link being identified by the class identifier associated with the destination MAC address of the one of the plurality of VN ports on the Enode.

* * * * *